US009584596B2

(12) United States Patent
Gilberton et al.

(10) Patent No.: US 9,584,596 B2
(45) Date of Patent: Feb. 28, 2017

(54) DEVICE FOR OBTAINING CONTENT BY CHOOSING THE TRANSPORT PROTOCOL ACCORDING TO THE AVAILABLE BANDWIDTH

(71) Applicant: THOMSON LICENSING, Issy de Moulineaux (FR)

(72) Inventors: Philippe Gilberton, Geveze (FR); Stephane Gouache, Cesson-Sevigne (FR); Yvon Legallais, Rennes (FR)

(73) Assignee: THOMSON LICENSING SA, Issy les Moulineaux (FR)

( * ) Notice: Subject to any disclaimer, the term of this patent is extended or adjusted under 35 U.S.C. 154(b) by 238 days.

(21) Appl. No.: 14/361,414

(22) PCT Filed: Nov. 29, 2012

(86) PCT No.: PCT/EP2012/073972
§ 371 (c)(1),
(2) Date: May 29, 2014

(87) PCT Pub. No.: WO2013/079598
PCT Pub. Date: Jun. 6, 2013

(65) Prior Publication Data
US 2014/0330887 A1    Nov. 6, 2014

(30) Foreign Application Priority Data
Dec. 1, 2011    (FR) ...................... 11 61045

(51) Int. Cl.
*G06F 15/16*    (2006.01)
*H04L 29/08*    (2006.01)
(Continued)

(52) U.S. Cl.
CPC .......... *H04L 67/101* (2013.01); *H04L 47/196* (2013.01); *H04L 47/38* (2013.01);
(Continued)

(58) Field of Classification Search
CPC ..... H04L 67/101; H04L 47/196; H04L 47/38; H04L 65/608; H04L 69/165; H04L 69/18; H04L 69/326
See application file for complete search history.

(56) References Cited

U.S. PATENT DOCUMENTS 7,400,678 B2 * 7/2008 Dankworth ....... H04L 29/06027
375/240.01
7,617,337 B1    11/2009 Beck et al.
(Continued)

FOREIGN PATENT DOCUMENTS

CN    1647480 A    7/2005
CN    1784674 A    6/2006
(Continued)

OTHER PUBLICATIONS

Qiu et al., "Optimizing HTTP-Based Adaptive Video Streaming for Wireless Access Networks", Proceedings of 3rd IEEE International Conference on Broadband Network & Multimedia Technology (IC-BNMT 2010), Oct. 26, 2010, pp. 1-8.
(Continued)

*Primary Examiner* — Moustafa M Meky
(74) *Attorney, Agent, or Firm* — Tutunjian & Bitetto, P.C.

(57) ABSTRACT

A device is intended to obtain content by means of at least two transport protocols having different requirements in terms of available network bandwidth. Such content is available in different versions on at least a content server and the versions correspond to different transmission binary bit rates and are subdivided into chunks adapted to be transmitted via a communication network. This device is arranged to request to said at least one server a transmission of at least one chunk according to a version of a content and according to a transport protocol, the transport protocol and
(Continued)

the version being selectable in response to a current value of the available bandwidth of said communication network.

20 Claims, 1 Drawing Sheet

(51) Int. Cl.
    *H04L 12/801*     (2013.01)
    *H04L 12/811*     (2013.01)
    *H04L 29/06*     (2006.01)

(52) U.S. Cl.
    CPC .......... *H04L 65/608* (2013.01); *H04L 69/165* (2013.01); *H04L 69/18* (2013.01); *H04L 69/326* (2013.01)

(56) References Cited

U.S. PATENT DOCUMENTS

| | | | |
|---|---|---|---|
| 7,720,983 B2 | 5/2010 | Klemets et al. | |
| 7,936,815 B2* | 5/2011 | Dankworth | H04L 29/06027 375/240.01 |
| 9,077,774 B2* | 7/2015 | Pikin | H04L 65/605 |
| 2004/0031054 A1* | 2/2004 | Dankworth | H04L 29/06027 725/86 |
| 2008/0209490 A1* | 8/2008 | Dankworth | H04L 29/06027 725/112 |
| 2011/0066703 A1 | 3/2011 | Kaplan et al. | |
| 2011/0249667 A1 | 10/2011 | Ranney | |
| 2012/0140018 A1* | 6/2012 | Pikin | H04L 65/605 348/14.02 |

FOREIGN PATENT DOCUMENTS

| | | |
|---|---|---|
| CN | 1960260 A | 5/2007 |
| EP | 1677540 | 7/2006 |

OTHER PUBLICATIONS

Chang et al., "An Evaluation of Transport Protocols in Peer-to-Peer Media Streaming", 2008 International Conference on Networking, Architecture, and Storage (NAS), Jun. 12, 2008, pp. 241-247.

Li et al., "Application, Network and Link Layer Measurements of Streaming Video over a Wireless Campus Network", Proceedings of the 6th Passive and Active Network Measurement Workshop (PAM), Mar. 31, 2005, Boston, Massachusetts, USA, pp. 1-14.

Mathis et al., "The macroscopic behavior of the TCP congestion avoidance algorithm", Computer Communication Review, vol. 27, No. 3, Jul. 1997, pp. 1-16.

Schulzrinne et al., "Request for Comments 2326: real time streaming protocol (RTSP)", Network Working Group, Apr. 1998, pp. 1-81.

Paila et al., "Request for Comments 3926: FLUTE—File Delivery over Unidirectional Transport", Network Working Group, Oct. 2004, pp. 1-35.

Zhang et al., "A UDP-based file transfer protocol with flow control using fuzzy logic approach", CCECE, Montreal, Canada, May 2003, pp. 827-830.

Lin et al. "Retransmission in Distributed Media Streaming", Network and Operating System Support for Digital Audio and Video, Jun. 13, 2005, Washington.

Ravindran et al. Architecture for Dynamic Protocol-level Adaptation to Enhance NetworkService Performance, Network Operations and Management Symposium, 2006,10th IEEE/IFIP Vancouver, BC, Canada0IEEE, Apr. 3, 2006, pp. 448-458.

Search Report Dated Feb. 25, 2013.

* cited by examiner

DEVICE FOR OBTAINING CONTENT BY CHOOSING THE TRANSPORT PROTOCOL ACCORDING TO THE AVAILABLE BANDWIDTH

This application claims the benefit, under 35 U.S.C. §365 of International Application PCT/EP2012/073972, filed Nov. 29, 2012, which was published in accordance with PCT Article 21(2) on Jun. 6, 2013 in English and which claims the benefit of French patent application No. 1161045, filed Dec. 1, 2011.

TECHNICAL DOMAIN OF THE INVENTION

The invention relates to the transmission of content whether it is in a streaming mode or in a full file download mode.

It is noted that streaming comprises successively transmitting to at least one content receiver, via a communication network (cabled or wireless), chunks (or parts—micro-files) of content in order for them to be used in real time in streaming. This first type of transmission can be done by means of different streaming protocols, as for example RTP or MPEG-TS on UDP, HTTP streaming, or more recently HTTP adaptive streaming. Full file downloading requires having received all or part of a file in order to be able to play it. This second transmission type is generally by means of http on TCP protocol.

It is understood here by "content" a set of data that defines a television programme (video and audio), game or documents, possibly delivered on request in the form of a file (multimedia, game, documents).

PRIOR ART

Persons skilled in the art know that the data transmission bit rate is a parameter that can fluctuate within a communication network, sometimes in a significant and/or lasting manner, which can induce at the level of the content receivers a variation in the recovered quality of the images and/or sound of the content received. Indeed, if the bandwidth offered at a given time by a communication network is momentarily incompatible with the data transmission bit rate, a part of the data of this content will not be able to be received by the requiring content receiver, and thus the latter can at best momentarily recover images and/or sound of degraded quality and at worst not recover anything at all.

In order to limit the consequences of the aforementioned fluctuations, it has been proposed to generate from a same content several different versions that correspond to different transmission bit rates. Hence, when a content receiver, connected to a communication network, wants to recover a content via the latter, it requires at each chosen time the version of this content that is the best adapted to the conditions offered by this communication network at this chosen time, which prevents frozen images. Unfortunately, in quite fluctuating environments, this solution tends to increase the transmission of chunks in versions that most often correspond to low transmission bit rates, which degrades the general quality experienced by the user. To improve the situation, it is possible to impose a stricter control of the algorithm responsible for choosing the transmission bit rate. But this does not allow the situation to be improved when the content receiver is constrained by the very principle of its transport protocol to share the bandwidth of the communication network with one or more simultaneous applications (for example downloading or browsing).

SUMMARY OF THE INVENTION

The invention thus has the purpose of improving the situation, and more specifically the experience of the user when the transmission conditions fluctuate within the communication network.

For this purpose, the invention proposes a device intended to obtain content which is available in different versions on at least a server (SC) and wherein the different versions correspond to different transmission binary bit rates and subdivided into chunks adapted to be transmitted via a communication network by means of at least two transport protocols having different requirements in terms of available network bandwidth.

This device is characterized by the fact that it is arranged to choose a transport protocol, that must be used at a given time by the at least one server to transmit at least one required next chunk of a version of a content to the obtaining device. The choice of transport protocol comprises either a first transport protocol when the current value of the available bandwidth of the communication network is strictly greater than a first threshold, or a second transport protocol (having lesser requirements that those of the first transport protocol in terms of available network bandwidth) when this current value of the bandwidth is less than or equal to the first threshold. This device is further arranged to send to the at least one server a request for transmitting at least one required next chunk of a version of a content by means of the chosen transport protocol.

The device according to the invention can comprise other characteristics that can be taken separately or in combination, notably:
  it can be arranged to choose the first threshold according a required version of a content that is to a required level of definition of the content,
  it can be arranged to analyse the current value of a packet loss rate. In this case, when it has chosen the second transport protocol for the transmission of a chunk of a version corresponding to a first transmission bit rate, it can request the transmission of this same chunk but in another version, which corresponds to a second transmission bit rate lower than the first transmission bit rate, when the current value of the packet loss rate is strictly greater than a second threshold,
  it can be arranged to choose a transport protocol and send to the at least one server a request at a plurality of given time during the transmission of the content to obtain thus being adaptative during the transmission of the whole content,
  it can be arranged to choose at each given time the transport protocol that must further be used according to a predefined distribution of the use of the first and second transport protocols on a time slot,
  the time slot can be sliding,
  it can be arranged to use a 75%/25% predefined distribution of the first and second transport protocols on the time slot,
  when it has chosen the second transport protocol for the transmission of a chunk of a version, it can be arranged to trigger a retransmission mechanism of data packets not received from this version chunk by means of the first transport protocol, it can be arranged to request each retransmission of data packets from a content server that is dedicated to the retransmissions, the first transport protocol can be TCP and the second transport protocol can be UDP, for a choice of the second transport protocol at a given time, it can be arranged to choose the content version that corresponds to the transmission bit rate that has the value the closest to the current value of the bandwidth at this given time, it can be arranged to recover a description file, that is stored in correspondence with versions of a content that it wants to obtain and that describes their respective transmission bit rates, so as to make a first choice of transport protocol to obtain this content, it can be arranged to obtain the transmission of a content either in a streaming mode or in a full file download mode.

The invention also proposes a content receiver comprising a device for obtaining content of the type of the one set out above.

Such a content receiver can, for example, be presented in the form of a box of the set-top box type, a decoder, a residential or home gateway, a fixed computer or laptop, a mobile phone, a personal digital assistant, or an electronic tablet.

The invention also proposes a method for obtaining content implementing steps performed by a content obtaining device. The features above described for the content obtaining device can be used in any combination in such a method for obtaining a content.

BRIEF DESCRIPTION OF THE DRAWINGS

Other characteristics and advantages of the invention will appear upon examination of the detailed description hereafter, and the annexed drawings, wherein.

The annexed drawings can not only serve to complete the invention, but also contribute if necessary, to its definition.

DETAILED DESCRIPTION

The purpose of invention is notably to propose a device for obtaining content D intended to be associated with at least one content receiver CR coupled to a communication network N.

Hereafter, it is considered, as a non-restrictive example, that the content receiver CR is a set-top box (or STB). But, the invention is not limited to this type of content receiver. Indeed, it relates to any type of content receiver being able to be connected to at least one communication network so as to receive content, and capable of restoring a content. Consequently, it can also involve, for example, a decoder, a residential gateway, a home gateway, a fixed computer or laptop, a mobile phone (possibly of the smartphone type), a Personal Digital Assistant (or PDA), an electronic tablet, or a games console.

Moreover, it is considered in what follows, as a non-restrictive example, that the contents are multimedia contents. But, the invention is not limited to this type of content. Indeed, it relates to any type of content available in the form of data files or file chunks, and notably television programmes, games, cinematographic programmes, music, and computer generated imagery (or CGI).

Figure 1:
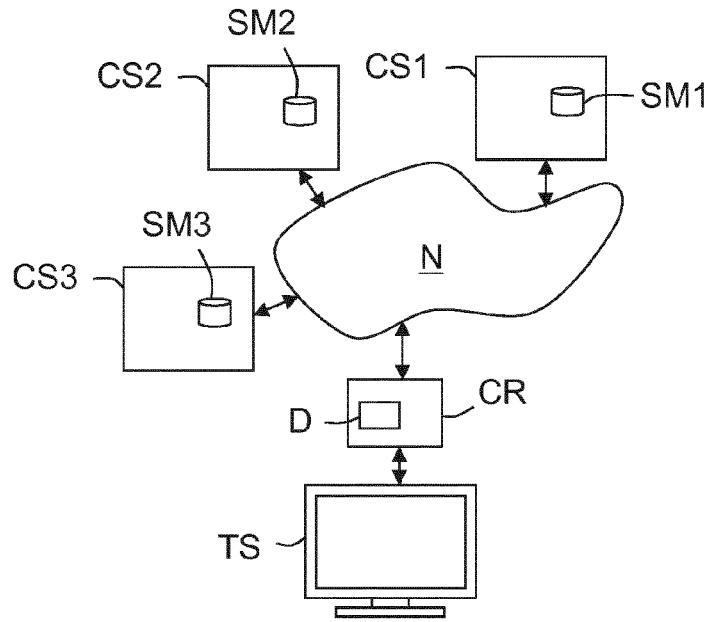
FIG. 1 diagrammatically and functionally illustrates a communication network to which are connected three content servers and a content receiver equipped with a device for obtaining content according to an embodiment of the invention, FIG. 2 diagrammatically illustrates four different versions of a same content corresponding respectively to four different transmission bit rates, FIG. 3 diagrammatically illustrates with a diagram a first example of temporal change (t) of the bandwidth (BW) of a communication network and a first example of chunks of a content transmitted to a device for obtaining content according to an embodiment of the invention, arranged in a first manner, in the presence of this first example of temporal change, and FIG. 4 diagrammatically illustrates with a diagram a second example of temporal change (t) of the bandwidth (BW) of a communication network and a second example of chunks of a content transmitted to a device for obtaining content according to an embodiment of the invention, arranged in a second manner, in the presence of this second example of temporal change.

FIG. 1 diagrammatically illustrates a communication network N to which are connected three content servers SC1 to SC3, suitable to store content, and a content receiver CR, intended to decode contents transmitted by one of the servers CS1 to CS3 (at the request of a device for obtaining content D according to the invention).

For example, and as illustrated in a non-restrictive manner, the set-top box CR is coupled to at least one television set responsible for restoring the content that it will have decoded and that are from a server CS1, CS2 or CS3 via communication network N.

It is considered in what follows, as a non-restrictive example, that the communication network N is a network constituted by the Internet network connected to the use by an xDSL access network. But the invention is not limited to this kind of communication network. Indeed, the communication network N can be cabled or wireless. Hence, it can also be a cabled network of the cable or fibre type, or a mobile or cellular or WLAN (Wireless Local Area Network—possibly of the 802.11 (or WiFi) or WiMAX type) network, or even a very short range wireless local network of the Bluetooth type.

It is important to note that the communication R must be capable of supporting at least two transport protocols having different requirements in terms of available network bandwidth. As a non-restrictive example, the communication network N supports a first transport protocol of type TCP (Transmission Control Protocol) and a second transport protocol of type UDP (User Datagram Protocol). But other combinations of transport protocols can be envisaged.

The first (content) server CS1 is for example responsible for storing in first storage means SM1 different content versions Vj. These first storage means SM1 be presented in any form known to those skilled in the art, including software. Consequently, it could be a memory.

Figure 2:
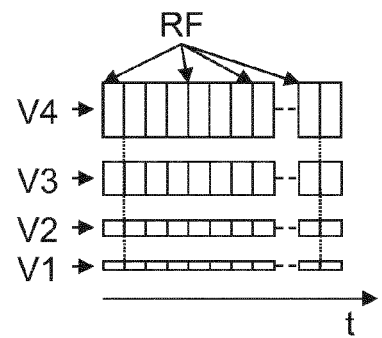

It is understood by "different versions of a content", versions that correspond to different transmission bit rates. FIG. 2 diagrammatically illustrates four different versions V1 to V4 (j=1 to 4) of a same content corresponding respectively to four different transmission bit rates, as for example 1 Mbps (megabits per second) for the first version V1, 2 Mbps for the second version V2, 4 Mbps for the third version V3, and 6 Mbps for the fourth version V4.

Each version Vj of a content is constituted by a multiplicity of chunks (or parts—micro-files) of determined durations. In the example of FIG. 2, each chunk of a version Vj is materialised by a rectangle, the height of which is representative of the corresponding transmission bit rate.

The number of versions of a same content can be equal to any value at least equal to two (2).

It will be noted that the versions Vj of a same content can, for example, have been generated by coding by means of a video compression technique, as for example MVC (Multiview Video Coding), AVC (Advanced Video Coding), SVC (Scalable Video Coding), MPEG2, H264, and more generally any type of video compression enabling an encapsulation in a format dedicated to transport (streaming) or to storage (downloading), including for audio data.

The different versions Vj of each content corresponding to different transmission bit rates, it will be understood that they are correctly matched to fluctuating transmission conditions within the communication network N.

It will be noted, as illustrated in FIG. 2, that the versions Vj of a same content preferentially comprise reference frames RF whose temporal positions are identical from one version to the other. It is recalled that the reference frames RF are the ones that can randomly access a chunk of a content that is transmitted in streaming. In the illustrated example, each reference frame RF is placed at the start of a chunk of a version Vj of content. This allows a decoder installed in a content receiver CR to move from one version Vj to another Vj', upon request, at specific times (that are the transmission times of the reference frames RF) without this creating any visual artefact (typically each video chunk starts and possibly finished with a key image for a transition from one chunk to the other invisible for the user).

It will also be noted that the versions Vj of each content are preferentially stored in correspondence with a description file that describes their respective bit rates. Each description file is for example of the SDP type (Session Description Protocol). This description file will be dealt with further on.

The second CS2 and third (CS3) content servers are here intended for possible retransmissions of data packets of contents that have not been received by a content receiver CR. Their advantage will be understood further on.

The versions Vj, that are stored in the first server CS1, are intended to be transmitted on request to at least one content receiver CR. For this purpose, each content receiver CR can be associated with a device for obtaining content D according to the invention.

It is understood here by "associated" both the fact of being an integral part of the content receiver CR as illustrated in a non-restrictive manner), as well as the fact of being coupled directly to the content receiver CR. Consequently, a device for obtaining content D can be realised in the form of software (or computer) modules, or else of a combination of electronic circuits and software modules.

This device for obtaining content D is arranged to choose as transport protocol that must be used at a given time, to transmit at least one required next chunk of a version Vj of a content, either a first transport protocol when the current value of the available bandwidth BW of the communication network N is strictly greater than a first threshold S1, or a second transport protocol when this current value of the bandwidth BW is less than or equal to the first threshold S1.

It will be noted that the bandwidth BW available in a communication network N can become less than or equal to the first threshold S1 when this communication network N experiences a technical problem or a congestion of the access network.

It is also important to note that the first transport protocol requires more available network bandwidth BW that the second transport protocol This is notably the case for the TCP protocol that notably requires more available network bandwidth than the UDP protocol. This results mainly from the fact that TCP is of the bidirectional type, requires the transmission of acknowledgements, imposes constraints on the window size adjustments (or windowing), and offers a retransmission mechanism of data packets not received whereas UDP is of the unidirectional type (and thus without any acknowledgement) and with no constraint on the windowing and retransmission mechanism of data packets not received.

It is recalled that the windowing designates the size of a window that is dynamically negotiated during a TCP session and that it constitutes a type of stream control mechanism. More specifically, when the data is transmitted, the source must receive an acknowledgement from the recipient and the latter must signal to the source the size of the window that it desires and that the representative of the number of packets that the recipient is ready to receive.

Purely for illustration purposes, for a transfer of content at 1 Mbps, in the presence of a round trip time equal to 30 ms and a packet loss rate equal to 0.02 (or 2%), TCP requires 30% more bandwidth than UDP to transport the same quantity of data. It will be noted that the previous example relates to the http traffic on TCP compared with the RTP traffic on UDP (including a retransmission mechanism of data packets not received).

Thanks to the invention, each time that the second protocol (here UDP) is temporarily used to recover chunks of a content instead of the first protocol (here TCP), the user that required this content has a greater probability of obtaining a version Vj that corresponds to a high transmission bit rate (that is having the closest value to the current value of the available bandwidth BW). Consequently, each time that UDP is chosen, for example following congestion in the communication network N, the quality restored by the content receiver CR of the user has a greater probability of being better than in the case of using TCP. For example, and always in the case of a congestion, the invention will be able to request a lower bit rate chunk as the http/TCP protocol would have done, but a chunk of higher the equal bit rate in RTP/UDP.

It will further be noted that the device for obtaining content D can also and possibly be arranged, when it has chosen the second transport protocol at a given time, to choose the version Vj of content that corresponds to the transmission bit rate that has the closest value to the current value of the available bandwidth BW at this given time.

It will be noted that in order to know the different versions Vj of a required content, the device for obtaining content D is preferably arranged to order its content receiver CR to recover, from the first server CS1 concerned, the description file that it stores in correspondence with these versions Vj (and that describes their respective transmission bit rates). In this case, once the content receiver CR has recovered from the first server SC1 concerned the required description file, the device for obtaining content D can start a session for obtaining content (either in streaming mode, or in full file download mode), by controlling in a noticeably continuous manner the chosen (or selected) version Vj of the content required according to the available bandwidth BW in the communication network N. The device for obtaining content D will then supply its content receiver CR with the designation of each version Vj that it will have chosen (and that is mentioned in the description file) in order for it to claim it from the first server CS1 concerned.

It is considered in what follows, as a non-restrictive example, that the contents are transmitted in streaming mode.

In this case, the device for obtaining content D can order its content receiver CR to initiate an RTSP (Real-Time Streaming Protocol) session with the first server SC1 when it has chosen the second protocol (here UDP). It is recalled that the RTSP is a protocol defined by the RFC 2326 rule, complementary to the RTP protocol (Real-Time Protocol) and notably dedicated to setting up and controlling multimedia content transfer sessions in streaming mode. In this case, the content receiver CR can send an "RTSP describe URI" message to the first server CS1, in order to obtain the description file of the required content. Then, the first server CS1 responds with an "RTSP describe response" message to transmit the required description file. Then, the content receiver CR can send an "RTSP setup" message to the first server SC1, so as to prepare the RTP/UDP streaming session. Then, the first server CS1 responds with an "RTSP setup response" to signal that this session is prepared. Then, the content receiver CR can send an "RTSP play" message to the first server SC1, to ask it to start the previously prepared session. Then, the first server CS1 responds with an "RTSP play response" message to signal that it will begin the RTP/UDP streaming session. It will then encapsulate the containers of the required content, for example, in the format MP4 or MPEG-TS, in packets that are sent in streaming mode on UDP.

It will be noted that when the content is transmitted in full file download mode, the FLUTE protocol (defined by the RFC 3926 rule) can be used instead of the RTP protocol.

Each time that the device for obtaining content D decides to recover a chunk of a content, it must specify the identifier that represents this chunk in the version Vj that it has chosen and a time slot equal to the time of this chunk and designating the start time of this chunk. This can be done by exchanging messages of the RTSP type.

It will also be noted that the device for obtaining content D can be arranged so as to choose the first threshold S1 according to the level of definition of the content that it wants to require. It will be understood that the lower the definition of a content, the lower the first threshold S1 can be. Hence, the first threshold S1 can be chosen increasing from a standard definition up to a very high definition, including a high definition The device for obtaining content D can operate in at least two different manners.

A first manner has been described above. It is well adapted, although not restrictively, to the local applications, for example home, for which the sharing fairness of the bandwidth is not a priority. It is suitable, for instance, to a user who wants to watch, on the screen of a television set TS (connected to its CR STB or to its home gateway) video that is stored in the memory of an item of fixed (such as a desktop computer) or nomad (such as for example a mobile phone or video play or a laptop computer) communication equipment capable of communicating with this CR STB or this home gateway, for example in WiFi/PLC streaming mode.

Figure 3:
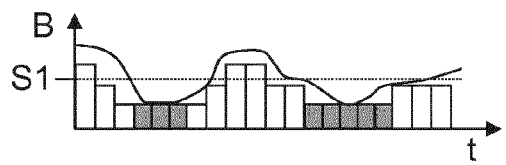

FIG. 3 diagrammatically illustrates, within a diagram, a first example of a curve showing changes in the available bandwidth BW of a communication network N according to the time t. This same diagram also represents chunks of a content that are transmitted to a device for obtaining content D in the presence of this first temporal change curve. The white rectangles of different sizes materialise the content chunks belonging to three versions Vj corresponding respectively to three different transmission bit rates and transmitted by the first server SC1 by means of the first transport protocol (here TCP (for example in combination with http (that is http/TCP))). The single size grey rectangles materialise the content chunks belonging to a single version Vj corresponding to a transmission bit rate and transmitted by the first server SC1 by means of the second transport protocol (here UDP (for example in combination with RTP (that is RTP/UDP)).

As it can be seen in this first example, each time that the value of the available bandwidth becomes less than or equal to the first threshold S1, the device for obtaining content D orders the first server SC1 to use the second transport protocol (here UDP).

This first manner can comprise an option intended to take into account the current value of a packet loss rate (or plr) in the case of the use of RTP on UDP. In this case, the device for obtaining content D can be arranged to analyse the current value of the packet loss rate (here plr). Hence, if it has chosen the second transport protocol (here UDP) for the transmission of a chunk of a version Vj corresponding to a first transmission bit rate, it can require the transmission of this same chunk but in another version Vj' (with j'≠j), which corresponds to a second transmission bit rate that is lower than the first transmission bit rate, when it detects that the current value of the packet loss rate is strictly greater than a second threshold S2.

It is recalled that the plr parameter is calculated by comparing the number of RTP packets received, for example in a sliding window (for example refreshed every 100 RTP packets received), with the number of RTP packets initially transmitted, which is mentioned in each RTP packet header (in compliance with rule RFC 3550 in which it is called the sequence number). It is therefore sufficient to detect the sequence number hops to deduce from them a packet loss and the number of packets lost.

In the case of the plr parameter, the second threshold S2 can, for example, be chosen equal to 4% or 5%.

A second manner is well adapted, although not restrictively, to the applications for which the sharing equity of the bandwidth is a priority. It is suitable, for instance, to a user who wants to watch, on the screen of an item of electronic (possibly communication) equipment, such as for example a television set TS, a video that is recovered by a content receiver CR coupled to this electronic equipment, such as for example the ST or a home gateway. It will be understood that in this type of situation the video is transported by a communication network N that is shared by a great number of users and therefore, for a reason of fairness, the bandwidth must not be systematically used by the same user owing to the use of the second transport protocol (here UDP) each time that the available bandwidth BW of the communication network N becomes less than the first threshold S1.

For this purpose, the device for obtaining content D can be arranged to choose at each given time the transport protocol that must be used according to not only the current value of the available bandwidth BW but also a predefined distribution of the use of the first and second transport protocols on a time slot, preferably sliding.

As a non-restrictive example, the device for obtaining content D can use a predefined definition of the 75%/25% type of the first and second transport protocols on the time slot (75% for the first transport protocol and 25% for the second transport protocol).

Figure 4:
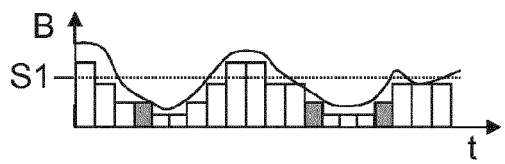

FIG. 4 diagrammatically illustrates, within a diagram, a second example of a curve showing changes in the available bandwidth BW of a communication network N according to the time t. This same diagram also represents chunks of a content that are transmitted to a device for obtaining content D in the presence of this second temporal change curve. The white rectangles of different sizes materialise the content chunks belonging to four versions Vj corresponding respectively to four different transmission bit rates and transmitted by the first server SC1 by means of the first transport protocol (here TCP (for example in combination with http (that is http/TCP))). The single size grey rectangles materialise the content chunks belonging to a single version Vj corresponding to a transmission bit rate and transmitted by the first server SC1 by means of the second transport protocol (here UDP (for example in combination with RTP (that is RTP/UDP)).

As can be observed in this second example, the second transport protocol (here UDP) is not used systematically each time the value of the available bandwidth BW becomes less than or equal to the first threshold S1. It is in fact used at the request of the device for obtaining content D when the value of the available bandwidth BW becomes less than or equal to the first threshold S1, provided that its use in the current time slot does not exceed the percentage that was allocated to it by the chosen distribution. It can indeed be noted that in certain cases, the second transport protocol is not used whereas even the available bandwidth BW is less than or equal to the first threshold S1.

When the second transport protocol does not comprise any retransmission mechanism for data packets not received, as is the case with UDP, it is advantageous that the device for obtaining content D is arranged, when it has chosen this second transport protocol for the transmission of a chunk of a version Vj, to trigger a retransmission mechanism for data packets not received from this chunk of version Vj by means of the first transport protocol. To do this, the device for obtaining content D can, for example, order its content receiver to transmit a retransmission request of the RTSP type to a server, to which this latter responds by initiating a http/TCP session.

It will be noted that each retransmission of data packets can be required from a content server CS2 or CS3 that is dedicated to the retransmissions. Indeed, not only does this prevent the first server SC1 from carrying out an additional task, but above all it enables the use within the communication network N of a path that differs from the one (or the ones) used by the first server CS1 and on which the data packets were lost (this thus offers a path diversity). Moreover, the fact of dedicating one or more content servers solely to retransmissions of data packets not received can reduce the time of the retransmissions.

The invention is not restricted to embodiments of the device for obtaining content and receiving content described above, provided only as a non-restrictive example, but includes all the variants that can be envisaged by those skilled in the art in the framework of the following claims.

The invention claimed is:

1. A device for obtaining content by at least two transport protocols having different requirements in terms of available network bandwidth, wherein said content is available in different versions on at least one server, wherein said different versions of a content correspond to different transmission bit rates and are subdivided into chunks adapted to be transmitted via a communication network, wherein said device is arranged to request to said at least one server a transmission of at least one chunk according to a version of a content and according to a transport protocol, the transport protocol and the version being selectable in response to a current available bandwidth of said communication network.

2. The device according to claim 1, wherein a first transport protocol is requested in the case where said current available bandwidth is above a first value, and in that a second transport protocol is requested in the case where said current available bandwidth is below said first value.

3. The device according to claim 2, wherein said first value is function of said version of a content.

4. The device according to claim 2, wherein it is arranged to analyse a current packet loss rate, and, in the case where said second transport protocol is required for the transmission of a chunk of a version corresponding to a first transmission bit rate and in the case where said current packet loss rate is higher than a second value, to request the transmission of this same chunk but in another version, corresponding to a second transmission bit rate lower than the first transmission bit rate.

5. The device according to claim 2, wherein it is arranged, when said second transport protocol is requested for the transmission of a chunk of a version, to trigger a retransmission mechanism of data packets not received from this version chunk by said first transport protocol.

6. The device according to claim 5, wherein it is arranged to request each retransmission of data packets from a content server dedicated to said retransmissions.

7. The device according to claim 2, wherein said first transport protocol is TCP and said second transport protocol is UDP.

8. The device according to claim 2, wherein it is arranged, in case where said second transport protocol is requested, to require the content version that corresponds to the transmission bit rate that is the closest to the current value of the bandwidth for said chunk.

9. The device according to claim 1, wherein it is arranged to successively request the transmission of at least one chunk of a required version according to a transport protocol for a plurality of successive chunks to obtain said content.

10. The device according to claim 1, wherein it is arranged to request for each chunk the transport protocol that must further be used according to a distribution of the use of said first and second transport protocols on a time slot.

11. The device according to claim 10, wherein said time slot is sliding.

12. The device according to claim 10, wherein it is arranged to use a 75%/25% predefined distribution of said first and second transport protocols on said time slot.

13. The device according to claim 1, wherein it is arranged to recover a description file stored in correspondence with versions of a content that it wants to obtain and describing their respective transmission bit rates, so as to select the transport protocol to obtain this content.

14. The device according to claim 1, wherein it is arranged to obtain the transmission of a content either in a streaming mode, or in a download mode.

15. The device according to claim 1, wherein it is configured to request to a first content server a transmission of at least a next chunk of a version of a content using said first transport protocol and to request to a second content serve a transmission of at least a chunk of a next version of a content using said second transport protocol.

16. A method for obtaining content by at least two transport protocols having different requirements in terms of available network bandwidth, wherein said content is available in different versions on at least one server and wherein said different versions of a content correspond to different transmission bit rates and are subdivided into chunks adapted to be transmitted via a communication network, said method comprises, performed by a content obtaining device, requesting to said at least one server a transmission of at least one chunk according to a version of a content and according to a transport protocol, the transport protocol and the version being selectable in response to a current available bandwidth of said communication network.

17. The method according to claim 16, comprising successively requesting the transmission of at least one chunk of a required version according to a transport protocol for a plurality of successive chunks to obtain said content.

18. The method according to claim 16, comprising recovering a description file stored in correspondence with versions of a content and describing their respective transmission bit rates, so as to select the transport protocol to obtain this content.

19. The method according to claim 16, comprising obtaining the transmission of a content either in a streaming mode, or in a download mode.

20. The method according to claim 16, comprising:
   requesting to a first content server to transmit at least a next chunk of a version of a content using said first transport protocol; and
   requesting to a second content server to transmit at least a chunk of a next version of a content using said second transport protocol.

* * * * *